(12) United States Patent
Ikegami et al.

(10) Patent No.: US 8,047,018 B2
(45) Date of Patent: Nov. 1, 2011

(54) EJECTOR CYCLE SYSTEM

(75) Inventors: Makoto Ikegami, Anjo (JP); Hiroshi Oshitani, Toyota (JP); Etsuhisa Yamada, Kariya (JP); Naohisa Ishizaka, Okazaki (JP); Hirotsugu Takeuchi, Nagoya (JP); Takeyuki Sugiura, Anjo (JP); Takuo Maehara, Toyohashi (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 12/315,960

(22) Filed: Dec. 8, 2008

(65) Prior Publication Data

US 2009/0095013 A1    Apr. 16, 2009

Related U.S. Application Data

(63) Continuation of application No. 11/478,489, filed on Jun. 29, 2006, now abandoned.

(30) Foreign Application Priority Data

Jun. 30, 2005   (JP) .................................. 2005-191156
Aug. 11, 2005   (JP) .................................. 2005-233169
Aug. 18, 2005   (JP) .................................. 2005-237651

(51) Int. Cl.
*F25B 1/06*    (2006.01)

(52) U.S. Cl. ............. 62/500; 62/170; 62/228.1; 62/173; 62/225

(58) Field of Classification Search .................... 62/170, 62/500, 228.1, 173, 225
See application file for complete search history.

(56) References Cited

U.S. PATENT DOCUMENTS

| | | | |
|---|---|---|---|
| 2,512,869 A * | 6/1950 | McBroom .................. | 62/117 |
| 6,360,552 B1 | 3/2002 | Lee et al. | |
| 6,477,857 B2 * | 11/2002 | Takeuchi et al. ............. | 62/500 |
| 6,574,987 B2 | 6/2003 | Takeuchi et al. | |
| 6,675,609 B2 | 1/2004 | Takeuchi et al. | |
| 6,698,221 B1 | 3/2004 | You | |
| 6,920,922 B2 | 7/2005 | Takeuchi | |
| 7,178,359 B2 * | 2/2007 | Oshitani et al. ............. | 62/500 |
| 7,367,200 B2 | 5/2008 | Ikegami et al. | |
| 2001/0054293 A1 | 12/2001 | Gustafson et al. | |
| 2002/0000095 A1 | 1/2002 | Takeuchi et al. | |
| 2003/0131611 A1 | 7/2003 | Oshitani et al. | |
| 2004/0079102 A1 | 4/2004 | Umebayashi et al. | |

(Continued)

FOREIGN PATENT DOCUMENTS

JP    53-18852    2/1978

(Continued)

OTHER PUBLICATIONS

Notice of Reason of Refusal dated Nov. 20, 2008 in a corresponding Japanese application No. 2008-259313.

(Continued)

*Primary Examiner* — Frantz Jules
*Assistant Examiner* — Azim Rahim
(74) *Attorney, Agent, or Firm* — Harness, Dickey & Pierce, PLC

(57) ABSTRACT

An ejector cycle system with a refrigerant cycle through which refrigerant flows includes an ejector disposed downstream of a radiator, a first evaporator located to evaporate refrigerant flowing out of the ejector, a branch passage branched from a branch portion between the radiator and a nozzle portion of the ejector and coupled to a refrigerant suction port of the ejector, a throttling unit located in the branch passage, and a second evaporator located downstream of the throttling unit to evaporate refrigerant. In the ejector cycle system, a variable throttling device is located in a refrigerant passage between a refrigerant outlet of the radiator and the branch portion to decompress the refrigerant flowing out of the radiator.

12 Claims, 7 Drawing Sheets

U.S. PATENT DOCUMENTS

| | | |
|---|---|---|
| 2004/0206111 A1 | 10/2004 | Ikegami et al. |
| 2004/0211199 A1 | 10/2004 | Ozaki et al. |
| 2005/0011221 A1 | 1/2005 | Hirota |
| 2005/0178150 A1 | 8/2005 | Oshitani et al. |
| 2005/0268644 A1 | 12/2005 | Oshitani et al. |

FOREIGN PATENT DOCUMENTS

| | | |
|---|---|---|
| JP | 03-005674 | 1/1991 |
| JP | 04-316962 | 11/1992 |
| JP | 05-312421 | 11/1993 |
| JP | 6-109338 | 4/1994 |
| JP | 9-318169 | 12/1997 |
| JP | 2001-147050 | 5/2001 |
| JP | 2001-153473 | 6/2001 |
| JP | 2002-022295 | 1/2002 |
| JP | 2002-318018 | 10/2002 |
| JP | 2004-142506 | 5/2004 |
| JP | 2004-257694 | 9/2004 |
| WO | PCT/JP2006/307092 | 4/2006 |
| WO | 2006/109617 | 10/2006 |

OTHER PUBLICATIONS

Office Action dated Mar. 25, 2010 in corresponding CN Application No. 200810190346.7 with English translation.

Office Action dated Aug. 4, 2009 in corresponding U.S. Appl. No. 11/478,489.

Office action dated Oct. 23, 2009 in corresponding Chinese Application No. 2008 10131001.4

Office Action dated Apr. 14, 2010 in corresponding U.S. Appl. No. 11/478,489.

Office action dated Apr. 27, 2011 in corresponding U.S. Appl. No. 12/806,683.

Office action dated Mar. 15, 2011 in corresponding Japanese Application No. 2006-181315.

* cited by examiner

EJECTOR CYCLE SYSTEM

CROSS REFERENCE TO RELATED APPLICATION

This application is a continuation of application Ser. No. 11/478,489, filed on Jun. 29, 2006, the contents are hereby incorporated by reference in this application. This application is also based on Japanese Patent Applications No. 2005-191156 filed on Jun. 30, 2005, No. 2005-233169 filed on Aug. 11, 2005, and No. 2005-237651 filed on Aug. 18, 2005, the contents of which are incorporated herein by reference.

FIELD OF THE INVENTION

The present invention relates to an ejector cycle system having an ejector that functions as a refrigerant pressure reducing means and a refrigerant circulating means.

BACKGROUND OF THE INVENTION

Ejector cycle systems provided with multiple evaporators have been conventionally known as in JP Patent No. 3322263 (corresponding to U.S. Pat. No. 6,574,987, U.S. Pat. No. 6,477,857).

As illustrated in FIG. 6, a first evaporator 16 is connected downstream of an ejector 15 with respect to a refrigerant flow. An accumulator 32 that is a vapor-liquid separator is located downstream of the first evaporator 16 with respect to the refrigerant flow. Further, a second evaporator 20 is located between a liquid phase refrigerant outlet of the accumulator 32 and a refrigerant suction port 15b of the ejector 15. The two evaporators 16, 20 are simultaneously operated.

In this refrigerant cycle, a pressure drop caused by a high-speed flow of refrigerant as expanded is utilized to draw refrigerant that flows out of the second evaporator 20, and further, velocity energy of refrigerant as expanded is converted into pressure energy at a diffuser portion 15d (pressure increasing portion) to raise the refrigerant pressure (i.e., the inlet pressure of a compressor 11). Thus, power for driving the compressor 11 can be reduced, and the efficiency of cycle operation can be enhanced.

In this refrigerant cycle, heat absorbing (cooling) action can be produced from separate spaces by using the first evaporator 16 and the second evaporator 20, or it can be produced from one and the same space by the two evaporators 16, 20. Also, the interior of a vehicle compartment can be cooled by using the two evaporators 16, 20.

In this refrigerant cycle, refrigerant that flows out of a radiator 12 all passes through a nozzle portion 15a of the ejector 15. Here, the flow rate of refrigerant that passes through the nozzle portion 15a of the ejector 15 is referred to as Gnoz. This Gnoz is set to such a flow rate that the dryness of refrigerant on the outlet side of the first evaporator 16 becomes a predetermined value or below. The refrigerant depressurized through the nozzle portion 15a is mixed with the refrigerant drawn through the refrigerant suction port 15b of the ejector 15, and flows into the first evaporator 16. The refrigerant that flows out of the first evaporator 16 is separated into vapor phase refrigerant and liquid phase refrigerant in the accumulator 32.

The refrigerant suction port 15b of the ejector 15 is depressurized and thus produces sucking action. As a result, the second evaporator 20 is supplied with the liquid phase refrigerant separated in the accumulator 32. Here, the flow rate of refrigerant drawn through the refrigerant suction port 15b is referred to as Ge. The liquid phase refrigerant that flows into the second evaporator 20 is evaporated at the second evaporator 20. Therefore, most or all of the refrigerant drawn through the refrigerant suction port 15b is vapor phase refrigerant. Consequently, the flow rate Gnoz of liquid phase refrigerant substantially contributes to the cooling capacity of the first evaporator 16. Therefore, the cooling capacity of the first evaporator 16 is influenced by Gnoz.

By increasing the flow rate Ge of refrigerant drawn to the refrigerant suction port 15b of the ejector 15, the flow rate of liquid phase refrigerant that flows into the second evaporator 20 is increased. Accordingly, the cooling capacity of the second evaporator 20 can be increased without reducing the cooling capacity of the first evaporator 16, and thus the cooling capacity of the entire cycle is increased as well.

The cooling capacity of an evaporator is defined, for example, as increment in the enthalpy of refrigerant observed when the refrigerant absorbs heat from air in the evaporator. The increment in enthalpy is defined by multiplying an increment in the specific enthalpy of refrigerant per unit weight by the flow rate of the refrigerant. The cooling capacity of the entire cycle is defined as the sum Qer of increments in the enthalpy of refrigerant at the first and second evaporators 16 and 20. The cooling capacity may also be defined as the coefficient of performance (COP) obtained by dividing Qer by the power consumed by the compressor 11.

In a conventional cycle, therefore, the phenomenon illustrated in FIG. 8 takes place. That is, when the flow ratio $\eta$ ($\eta = Ge/Gnoz$) is increased, the cooling capacity Qer of the entire cycle is increased as well. The flow ratio 11 is the ratio of the flow rate Ge of refrigerant drawn into the refrigerant suction port 15b of the ejector 15 to the flow rate Gnoz of refrigerant that passes through the nozzle portion 15a of the ejector 15.

When the heat load of the conventional is low, the difference between the high pressure and the low pressure of refrigerant in the cycle is reduced; therefore, the input to the ejector 15 is reduced. In this case, a problem arises in the conventional cycle. Since the refrigerant flow rate Ge depends only on the refrigerant sucking capability of the ejector 15, the following takes placed: reduction in the input to the ejector 15→reduction in the refrigerant sucking capability of the ejector 15→reduction in the flow rate of liquid phase refrigerant that flows into the second evaporator 20→reduction in flow ratio $\eta$. This results in reduction in cooling capacity Qer.

The US 2005/0178150 proposes an ejector cycle illustrated in FIG. 7. In this ejector cycle of FIG. 7, a branch passage 18 is provided between the discharge side of a radiator 12 and the refrigerant inflow port of an ejector 15. A throttling mechanism 42 that adjusts the pressure and flow rate of refrigerant and a second evaporator 20 are located in this branch passage 18. The outlet of the second evaporator 20 is connected to the refrigerant suction port 15b of the ejector 15.

The flow of refrigerant is separated upstream of the ejector 15, and the separated refrigerant is drawn into the refrigerant suction port 15b through the branch passage 18. Therefore, the branch passage 18 is in parallel relation with the ejector 15 with respect to connection. For this reason, when refrigerant is supplied to the branch passage 18, the refrigerant sucking and discharging capability of the compressor 11 can be utilized in addition to the refrigerant sucking capability of the ejector 15.

Therefore, even though the phenomenon of reduction in the input to the ejector 15 and reduction in the refrigerant sucking capability of the ejector 15 occurs, the degree of reduction in the flow rate Ge of refrigerant drawn into the refrigerant suction port 15b of the ejector 15 can be reduced more than in the conventional cycle.

In the ejector cycle proposed in the US 2005/0178150, the flow of refrigerant is separated upstream of the ejector 15. Therefore, the flow rate Gn of refrigerant that flows out of the radiator 12 is equal to the sum of the flow rate Gnoz of refrigerant that passes through the nozzle portion 15a of the ejector 15 and the flow rate of refrigerant that flows into the second evaporator 20. The flow rate of refrigerant that flows into the second evaporator 20 is equal to the flow rate Ge of refrigerant drawn into the refrigerant suction port 15b of the ejector 15.

Therefore, the relation expressed as Gn=Gnoz+Ge can be maintained. Thus, when Gnoz is reduced, Ge is increased; when Gnoz is conversely increased, Ge is reduced. Therefore, even when the cooling capacity of the first evaporator 16 is lowered, the cooling capacity of the second evaporator 20 is increased; even when the cooling capacity of the second evaporator 20 is conversely reduced, the cooling capacity of the first evaporator 16 is increased. Hence, the cooling capacity Qer of the comparison cycle illustrated in FIG. 8 is brought. That is, in the comparison cycle, a change in cooling capacity Qer for a change in flow ratio η is smaller than that in the conventional cycle, and the cooling capacity is peaked at the optimum flow ratio ηmax.

Furthermore, in an ejector cycle system where refrigerant is circulated in a refrigerant cycle using a suction force of an ejector, oil is easily stayed in an evaporator based on an operation state of the ejector. Generally, a predetermined oil circulating amount is necessary when the system is operated under a low load for a long time in order to protect a compressor.

SUMMARY OF THE INVENTION

In view of the foregoing problems, it is required to make the flow ratio η close to the optimum flow ratio ηmax in the cycle in order to operate an ejector cycle system with high cooling capacity Qer.

It is an object of the present invention to operate an ejector cycle system with high cooling capacity in the whole refrigerant cycle.

It is another object of the present invention to provide an ejector cycle system in which a variable throttling device is located between a refrigerant outlet side of a radiator and a branch portion upstream of a nozzle portion of an ejector so as to improve the cycle efficiency in the whole refrigerant cycle.

According to an aspect of the present invention, an ejector cycle system with a refrigerant cycle through which refrigerant flows includes: a compressor configured to draw and compress refrigerant; a radiator located to radiate heat from high-pressure refrigerant discharged from the compressor; an ejector disposed downstream of the radiator, the ejector having a nozzle portion for depressurizing and expanding refrigerant, a refrigerant suction port through which refrigerant is drawn by a high-speed refrigerant flow jetted from the nozzle portion, and a pressure increasing portion for mixing refrigerant drawn through the refrigerant suction port with the high-speed refrigerant flow and for decelerating the mixed refrigerant flow to raise a pressure of the refrigerant flow; a first evaporator located to evaporate the refrigerant flowing out of the ejector; a branch passage that is branched from a branch portion between the radiator and the nozzle portion of the ejector and is coupled to the refrigerant suction port, for guiding the refrigerant flowing out of the radiator into the refrigerant suction port; a throttling unit that is located in the branch passage and depressurizes refrigerant to adjust a flow amount of refrigerant; and a second evaporator that is located downstream of the throttling unit to evaporate refrigerant. In the ejector cycle system, a variable throttling device is located in a refrigerant passage between a refrigerant outlet side of the radiator and the branch portion to decompress the refrigerant flowing out of the radiator.

Because the variable throttling device is located in the refrigerant passage between the refrigerant outlet side of the radiator and the branch portion, it is possible for the flow ratio η to be close to the optimum flow ratio ηmax by suitably setting a refrigerant passage sectional area of the nozzle portion of the ejector and a throttle open degree of the throttle unit. As a result, the ejector cycle system can be operated with a high cooling capacity in the whole refrigerant cycle, and can improve the cycle efficiency in the whole refrigerant cycle.

For example, the variable throttling device may be configured to adjust a flow amount of refrigerant in the whole refrigerant cycle, based on at least a physical quantity related to at least one of a state of refrigerant in the refrigerant cycle, a temperature of a space to be cooled by the first evaporator and the second evaporator, and an ambient temperature of the space to be cooled.

As one example, the physical quantity may be related to a superheat degree of refrigerant at a refrigerant outlet side of the first evaporator. In this case, the variable throttling device is configured to adjust the flow amount of refrigerant in the whole refrigerant cycle such that the superheat degree of the refrigerant at the refrigerant outlet side of the first evaporator is approached to a predetermined value.

As another example, the physical quantity may be related to a superheat degree of refrigerant at a refrigerant outlet side of the second evaporator. In this case, the variable throttling device is configured to adjust the flow amount of refrigerant in the whole refrigerant cycle such that the superheat degree of the refrigerant at the refrigerant outlet side of the second evaporator is approached to a predetermined value.

As another example, the physical quantity may be related to a supercool degree of refrigerant at a refrigerant outlet side of the radiator. In this case, the variable throttling device is configured to adjust the flow amount of refrigerant in the whole refrigerant cycle such that the supercool degree of the refrigerant at the refrigerant outlet side of the radiator is approached to a predetermined value.

Alternatively, the high-pressure refrigerant discharged from the compressor may have a pressure higher than a critical pressure of the refrigerant. In this case, the physical quantity is related to a temperature and a pressure of refrigerant at the refrigerant outlet side of the radiator, and the variable throttling device is configured to adjust the flow amount of refrigerant in the whole refrigerant cycle such that the pressure or the temperature of the refrigerant at the refrigerant outlet side of the radiator is approached to a predetermined value.

Alternatively, the physical quantity may be related to a flow amount of refrigerant discharged from the compressor. In this case, the variable throttling device is configured to adjust the flow amount of refrigerant in the whole refrigerant cycle such that the flow amount of refrigerant in the whole refrigerant cycle is approached to a predetermined value.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PREFERRED EMBODIMENTS

First Embodiment

The first embodiment is a preliminary embodiment for explaining the following second to fifth embodiments of the present invention.

Figure 1:
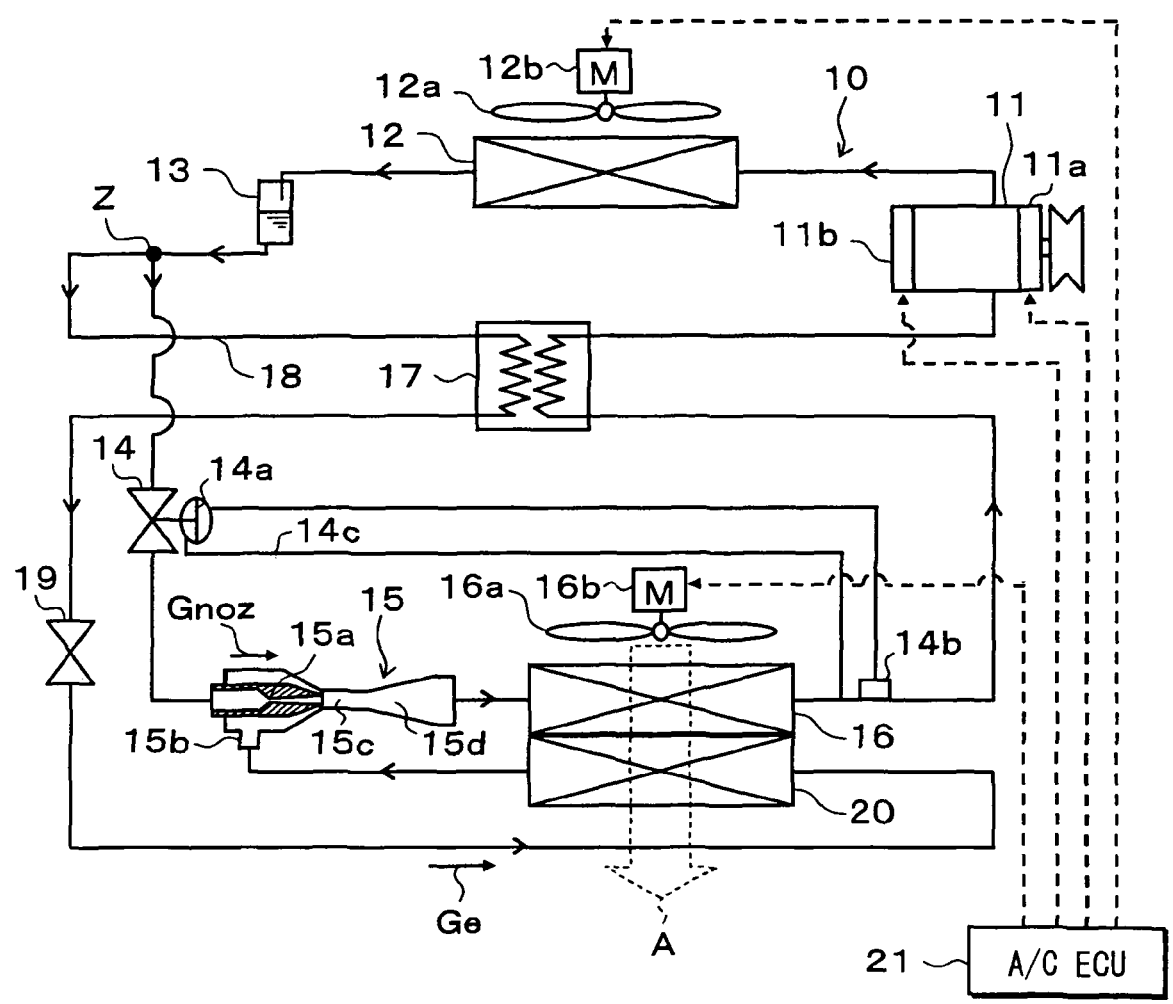
FIG. 1 is a schematic diagram showing an ejector cycle system according to a first embodiment that is a preliminary embodiment for explaining the following second to fifth embodiments of the present invention.

FIG. 1 illustrates an example in which an ejector cycle system 10 of the first embodiment is applied to a refrigerator device for vehicles. The refrigerator device for vehicles in this embodiment is so constructed as to lower the temperature inside a compartment to a very low temperature close to −20° C., for example.

In the ejector cycle system 10, a compressor 11 sucks in, compresses, and discharges refrigerant. The compressor 11 is rotationally driven by an engine for vehicle running (not shown) through an electromagnetic clutch 11a and a belt. This embodiment uses a swash plate-type variable displacement compressor whose discharge capacity can be continuously and variably controlled by external control signals.

More specific description will be given. The pressure in a swash plate chamber (not shown) is controlled utilizing the discharge pressure and the inlet pressure of the compressor 11. Thus, the angle of inclination of the swash plate is varied to change the piston stroke, and the discharge capacity is thereby continuously changed within the range from substantially 0% to 100%. Refrigerant discharge capability can be adjusted through this change in discharge capacity.

The discharge capacity is the geometric volume of an operating space in which refrigerant is drawn and compressed, and is equivalent to the cylinder capacity between the top dead center and the bottom dead center of a piston stroke.

Description will be given to the control of the pressure in the swash plate chamber. The compressor 11 is provided with an electromagnetic capacity control valve 11b. This electromagnetic capacity control valve 11b incorporates: a pressure response mechanism (not shown) that produces force F1 arising from the low refrigerant pressure on the suction side of the compressor 11; and an electromagnetic mechanism (not shown) that produces electromagnetic force F2 that counters this force F1 arising from the low refrigerant pressure Ps.

The electromagnetic force F2 of the electromagnetic mechanism is determined by control current In outputted from an air conditioning controller 21 described later. The pressure in the swash plate chamber is varied by changing the ratio of high-pressure refrigerant to low-pressure refrigerant introduced into the swash plate chamber by a valve body (not shown) that is displaced in correspondence with the force F1 corresponding to the low refrigerant pressure Ps and the electromagnetic force F2.

The discharge capacity of the compressor 11 can be continuously varied over the range from 100% to substantially 0% by the adjustment of the pressure in the swash plate chamber. Therefore, the compressor 11 can be brought substantially into operation stop state by reducing the discharge capacity to substantially 0%. Consequently, the compressor 11 may be constructed as a clutch-less compressor in which its rotating shaft is constantly coupled with a vehicle engine through a pulley and a belt V.

A radiator 12 is connected to the refrigerant discharge side of the compressor 11. The radiator 12 is a heat exchanger that exchanges heat between the high-pressure refrigerant discharged from the compressor 11 and the outside air (i.e., air outside the vehicle compartment) sent by a blower 12a for radiator to cool the high-pressure refrigerant.

The blower 12a for radiator is driven by an electric motor 12b for driving. The electric motor 12b for driving is so constructed that it is rotationally driven when applied voltage V1 is outputted from the air conditioning controller 21. Therefore, since the number of revolutions of the electric motor 12b for driving can be varied by the air conditioning controller 21 (A/C ECU) by varying the applied voltage V1, the quantity of air sent by the blower 12a for radiator 12 can be varied.

This embodiment uses ordinary fluorocarbon refrigerant as the refrigerant circulating in the cycle. Therefore, the ejector cycle system 10 constructs a subcritical cycle in which a high pressure does not exceed a critical pressure. Therefore, the radiator 12 functions as a condenser that cools and condenses refrigerant.

A liquid receiver 13 as a vapor-liquid separator that separates refrigerant into vapor and liquid and stores the liquid phase refrigerant is located downstream of the radiator 12 with respect to a refrigerant flow. Liquid phase refrigerant is guided out of this liquid receiver 13 to the downstream side. A variable throttling mechanism 14 is connected downstream of the liquid receiver 13 with respect to refrigerant flow.

Specifically, this variable throttling mechanism 14 is a generally known thermal expansion valve. The variable throttling mechanism 14 functions to depressurize the high-pressure liquid phase refrigerant from the liquid receiver 13 into intermediate-pressure refrigerant with the vapor and liquid two phases.

This thermal expansion valve adjusts the opening of a valve body portion (not shown) according to the degree of superheat of the refrigerant on the outlet side of a first evaporator 16 described later. Accordingly, the flow rate of refrigerant that passes through the variable throttling mechanism 14 can be adjusted, so that the degree of superheat of refrigerant on the outlet side of the first evaporator 16 approaches a predetermined value. That is, in this embodiment, the valve body portion of the thermal expansion valve makes a means for adjusting the flow ratio ($\eta$).

The valve body of the thermal expansion valve is coupled with a diaphragm mechanism 14a that forms a pressure responding means. The diaphragm mechanism 14a adjusts the opening of the valve body by displacing the valve body according to the following: the pressure of a filler gas medium in a temperature sensitive cylinder 14b (the pressure corresponding to the temperature of refrigerant on the outlet side of the first evaporator 16); and the pressure of refrigerant on the outlet side of the first evaporator 16, introduced through an equalizing pipe 14c. That is, in this embodiment, the temperature sensitive cylinder 14b and the equalizing pipe 14c make a means for detecting the physical quantities related to the state of refrigerant in the cycle.

An ejector 15 is connected with the outlet of the variable throttling mechanism 14. This ejector 15 is a pressure reducing unit for depressurizing refrigerant and is also a refrigerant circulating means for circulating refrigerant by the sucking action (engulfing action) of a refrigerant flow jetting out at high speed.

The ejector 15 is provided with: a nozzle portion 15a that narrows down the area of the passage and isoentropically decompresses intermediate-pressure refrigerant that passes through the variable throttling mechanism 14; and a refrigerant suction port 15b that is positioned in the same space as the refrigerant spout of the nozzle portion 15a and sucks in vapor phase refrigerant from a second evaporator 20 described later.

In addition, a mixing portion 15c is provided downstream of the nozzle portion 15a and the refrigerant suction port 15b. The mixing portion 15c mixes a high-speed refrigerant flow from the nozzle portion 15a with the refrigerant drawn through the refrigerant suction port 15b. A diffuser portion 15d that makes a pressure increasing portion is positioned downstream of the mixing portion 15c.

This diffuser portion 15d is formed in such a shape that the area of the refrigerant passage is gradually increased toward its outlet. The diffuser portion 15d functions to decelerate a refrigerant flow to increase the refrigerant pressure. That is, the diffuser portion 15d has a function of converting the velocity energy of refrigerant into pressure energy.

The first evaporator 16 is connected downstream of the diffuser portion 15d of the ejector 15. The first evaporator 16 is a heat exchanger that exchanges heat between air sent by a blower 16a for evaporator and refrigerant to evaporate the refrigerant, and thus produces heat absorbing action.

The blower 16a for evaporator is driven by an electric motor 16b for driving. The electric motor 16b for driving is so constructed that it is rotationally driven when applied voltage V2 is outputted from the air conditioning controller 21. Since the number of revolutions of the electric motor 16b for driving can be varied by the air conditioning controller 21 varying the applied voltage V2, the quantity of air sent by the blower 16a for evaporator can be varied.

The downstream portion of the first evaporator 16 with respect to a refrigerant flow is connected to an internal heat exchanger 17, and the refrigerant outlet of the internal heat exchanger 17 is connected to the suction side of the compressor 11.

A branch passage 18 is a refrigerant passage that connects the sections between the above-mentioned liquid receiver 13 and variable throttling mechanism 14 and the refrigerant suction port 15b of the ejector 15. Reference character Z denotes the branch portion of the branch passage 18. The above-mentioned internal heat exchanger 17 is located in this branch passage 18, and a fixed throttle 19 is located downstream of the internal heat exchanger 17. In addition, the second evaporator 20 is located downstream of the fixed throttle 19.

The internal heat exchanger 17 exchanges heat between the high-temperature, high-pressure refrigerant that passes through the branch passage 18 and the low-temperature, low-pressure refrigerant on the downstream side of the first evaporator 16. As the result of heat exchange between the refrigerants in the internal heat exchanger 17, the refrigerant that passes through the branch passage 18 is cooled. Therefore, the enthalpy difference between the refrigerants at the refrigerant inlet and outlet of the first evaporator 16 and the second evaporator 20 can be increased. That is, their cooling capacity of the first evaporator 16 and the second evaporator 20 can be increased.

The fixed throttle 19 adjusts the flow rate of and reduces the pressure of the refrigerant that flows into the second evaporator 20. Specifically, the fixed throttle 19 can be constructed of such a fixed throttle as a capillary tube or an orifice.

Figure 8:
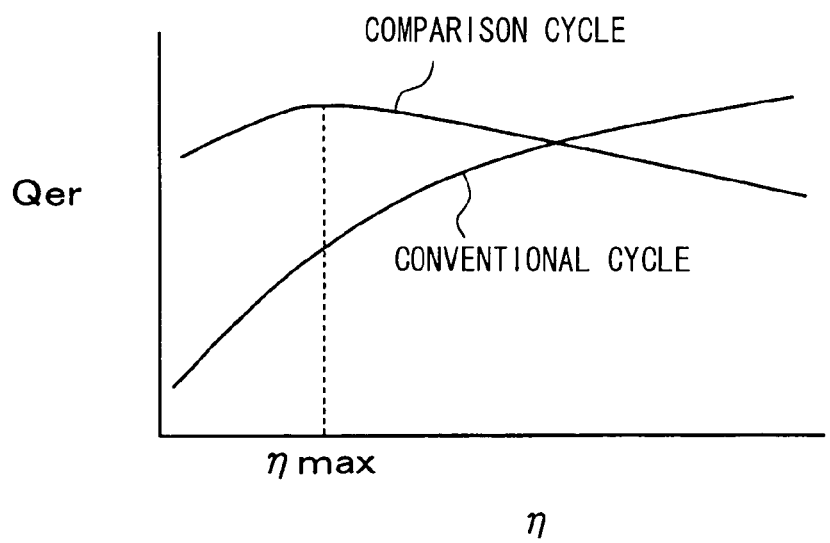
FIG. 8 is a graph showing a relationship between a cooling capacity and a flow ratio in the cycles of FIGS. 6 and 7.

The throttling opening of the fixed throttle 19 in this embodiment is set beforehand to a predetermined amount such that the flow ratio $\eta$ becomes equal to the optimum flow ratio $\eta max$ illustrated in FIG. 8. Here, $\eta = Ge/Gnoz$, where Ge is the flow rate of refrigerant drawn through the refrigerant suction port 15b of the ejector 15; and Gnoz is the flow rate of refrigerant that passes through the variable throttling mechanism 14 when the degree of superheat of refrigerant on the outlet side of the first evaporator 16 becomes equal to a predetermined value and further passes through the nozzle portion 15a of the ejector 15. The optimum flow ratio $\eta max$ is a flow ratio at which the cooling capacity Qer of the entire system approaches the maximum value.

This design can be implemented to appropriate values for the throttling opening of the variable throttling mechanism 14 observed when the degree of superheat of refrigerant on the outlet side of the first evaporator 16 becomes equal to a predetermined value. For example, the area of the refrigerant passage in the nozzle portion 15a of the ejector 15, the dimensions of the mixing portion 15c and the diffuser portion 15d, and the throttling opening of the fixed throttle 19 are made at suitable values. Also, this design is made with the following taken into account: pressure loss in the passage through which the refrigerant that passes through the variable throttling mechanism 14 flows; and the passage (branch passage 18) through which the refrigerant that passes through the fixed throttle 19 flows.

The second evaporator 20 is a heat exchanger that evaporates refrigerant and produces heat absorbing action. In this embodiment, the first evaporator 16 and the second evaporator 20 are assembled together so that an integral construction can be formed. More specifically, the components of the first evaporator 16 and the second evaporator 20 are formed of aluminum, and they are joined together by brazing so that they are of integral construction.

For this reason, the air sent by the above-mentioned blower 16a for evaporator flows as indicated by arrow A. Air is cooled at the first evaporator 16, and then cooled at the second evaporator 20. That is, one and the same space to be cooled is cooled by using the first evaporator 16 and the second evaporator 20.

The air conditioning controller 21 is constructed of a generally known microcomputer including CPU, ROM, RAM, and the like and its peripheral circuits. The air conditioning controller 21 carries out varied computation and processing based on control programs stored in its ROM to control the operation of the various devices 11a, 11b, 12b, 16b, and so on.

The air conditioning controller 21 is inputted with detection signals from a group of various sensors and various operation signals from an operation panel (not shown). Specifically, the provided group of sensors includes an ambient temperature sensor (outside air temperature sensor) that detects outside air temperature (temperature outside the vehicle compartment) and the like. The operation panel is provided with a temperature setting switch for setting the cooling temperature of the space to be cooled and the like.

Description will be given to the operation of this embodiment constructed as mentioned above. When the electromagnetic clutch 11a is energized by the control output of the air conditioning controller 21 to bring the electromagnetic clutch 11a into engagement, rotational driving force is transmitted from the engine for vehicle, running to the compressor 11. When a control current In is outputted from the air conditioning controller 21 to the electromagnetic capacity control valve 11b based on a control program, the compressor 11 sucks in, compresses, and discharges vapor phase refrigerant.

The high-temperature, high-pressure vapor phase refrigerant compressed in and discharged from the compressor 11 flows into the radiator 12. At the radiator 12, the high-temperature, high-pressure refrigerant is cooled by the outside air and condensed. The high-pressure refrigerant with heat radiated that flows out of the radiator 12 is separated into vapor phase refrigerant and liquid phase refrigerant in the liquid receiver 13. The liquid phase refrigerant that flows out of the liquid receiver 13 is separated at the branch portion Z into a refrigerant flow toward the variable throttling mechanism 14 and a refrigerant flow toward the branch passage 18.

The refrigerant flow heading for the variable throttling mechanism 14 has its pressure reduced and its flow rate adjusted at the variable throttling mechanism 14, and then flows into the ejector 15. At this time, the variable throttling mechanism 14 adjusts the flow rate of the refrigerant passing through the variable throttling mechanism 14 so that the degree of superheat of refrigerant on the outlet side of the first evaporator 16 approaches a predetermined value. That is, it adjusts the refrigerant flow rate Gnoz.

The refrigerant flow that enters the ejector 15 is further depressurized through the nozzle portion 15a and expanded. Therefore, the pressure energy of refrigerant is converted into velocity energy at the nozzle portion 15a, and the refrigerant is jetted from the jet port of this nozzle portion 15a at enhanced speed. The refrigerant (vapor phase refrigerant) that has passed through the second evaporator 20 in the branch passage 18 is drawn through the refrigerant suction port 15b by the refrigerant sucking action produced at this time.

The refrigerant jetted out of the nozzle portion 15a and the refrigerant drawn into the refrigerant suction port 15b are mixed together at the mixing portion 15c located downstream of the nozzle portion 15a, and flow into the diffuser portion 15d. At this diffuser portion 15d, the velocity (expansion) energy of refrigerant is converted into pressure energy by increase in the area of the passage. Therefore, the pressure of the refrigerant is raised.

The refrigerant that flows out of the diffuser portion 15d of the ejector 15 flows into the first evaporator 16. In the first evaporator 16, the low-temperature, low-pressure refrigerant absorbs heat from air sent by the blower 16a for evaporator, and is evaporated. The vapor phase refrigerant that has passed through the first evaporator 16 flows into the internal heat exchanger 17, and exchanges heat between it and the high-temperature, high-pressure refrigerant that flows through the branch passage 18 at the branch portion Z. The vapor phase refrigerant that flows out of the internal heat exchanger 17 is drawn into the compressor 11 and is compressed again.

The refrigerant flow that entered the branch passage 18 goes into the internal heat exchanger 17, and exchanges heat between it and the low-temperature, low-pressure vapor phase refrigerant that has flowed out of the first evaporator 16, as mentioned above. The refrigerant cooled through the internal heat exchanger 17 is depressurized through the fixed throttle 19 and is changed into low-pressure refrigerant. This low-pressure refrigerant flows into the second evaporator 20.

At the second evaporator 20, the low-pressure inflow refrigerant absorbs heat from the air sent in and cooled at the first evaporator 16, and is evaporated. The vapor phase refrigerant that has passed through the second evaporator 20 is drawn into the ejector 15 through the refrigerant suction port 15b. As mentioned above, the throttling opening of the fixed throttle 19 is set beforehand to a predetermined amount. Therefore, the flow rate Ge of refrigerant drawn into the refrigerant suction port 15b of the ejector 15 is such a flow rate that the flow ratio $\eta$ of it to Gnoz approaches the optimum flow ratio $\eta$max.

The vapor phase refrigerant evaporated at the second evaporator 20 is drawn through the refrigerant suction port 15b of the ejector 15. It is mixed at the mixing portion 15c with the liquid phase refrigerant that has passed through the nozzle portion 15a, and flows into the first evaporator 16.

In this embodiment, as mentioned above, the refrigerant on the downstream side of the diffuser portion 15d of the ejector 15 can be supplied to the first evaporator 16; at the same time, the refrigerant on the branch passage 18 side can be supplied to the second evaporator 20 through the fixed throttle 19. Therefore, the cooling action can be simultaneously produced with the first evaporator 16 and with the second evaporator 20.

The refrigerant evaporating pressure of the first evaporator 16 is a pressure obtained after pressurization through the diffuser portion 15d. Meanwhile, the outlet of the second evaporator 20 is connected to the refrigerant suction port 15b of the ejector 15. Therefore, the lowest pressure obtained immediately after depressurization through the nozzle portion 15a can be applied to the second evaporator 20. Thus, the refrigerant evaporating pressure (refrigerant evaporating temperature) of the second evaporator 20 can be made lower than the refrigerant evaporating pressure (refrigerant evaporating temperature) of the first evaporator 16.

The compression workload of the compressor 11 can be reduced by an amount by which the inlet pressure of the compressor 11 can be raised by the pressure raising action at the diffuser portion 15d of the ejector 15. Thus, the power saving effect can be achieved.

The variable throttling mechanism 14 in this embodiment adjusts the refrigerant flow rate Gnoz so that the degree of superheat of refrigerant on the outlet side of the first evaporator 16 approaches a predetermined value. As a result, the flow ratio $\eta$ is so adjusted that it approaches the optimum flow ratio $\eta$max at which the cooling capacity of the entire system is enhanced. Therefore, the entire cycle can be operated while high cooling capacity is delivered.

The degree of superheat of refrigerant on the outlet side of the first evaporator 16 is controlled; therefore, the liquid phase refrigerant can be prevented from returning to the compressor 11, and the stability of the cycle can be ensured.

Second Embodiment

Figure 2:
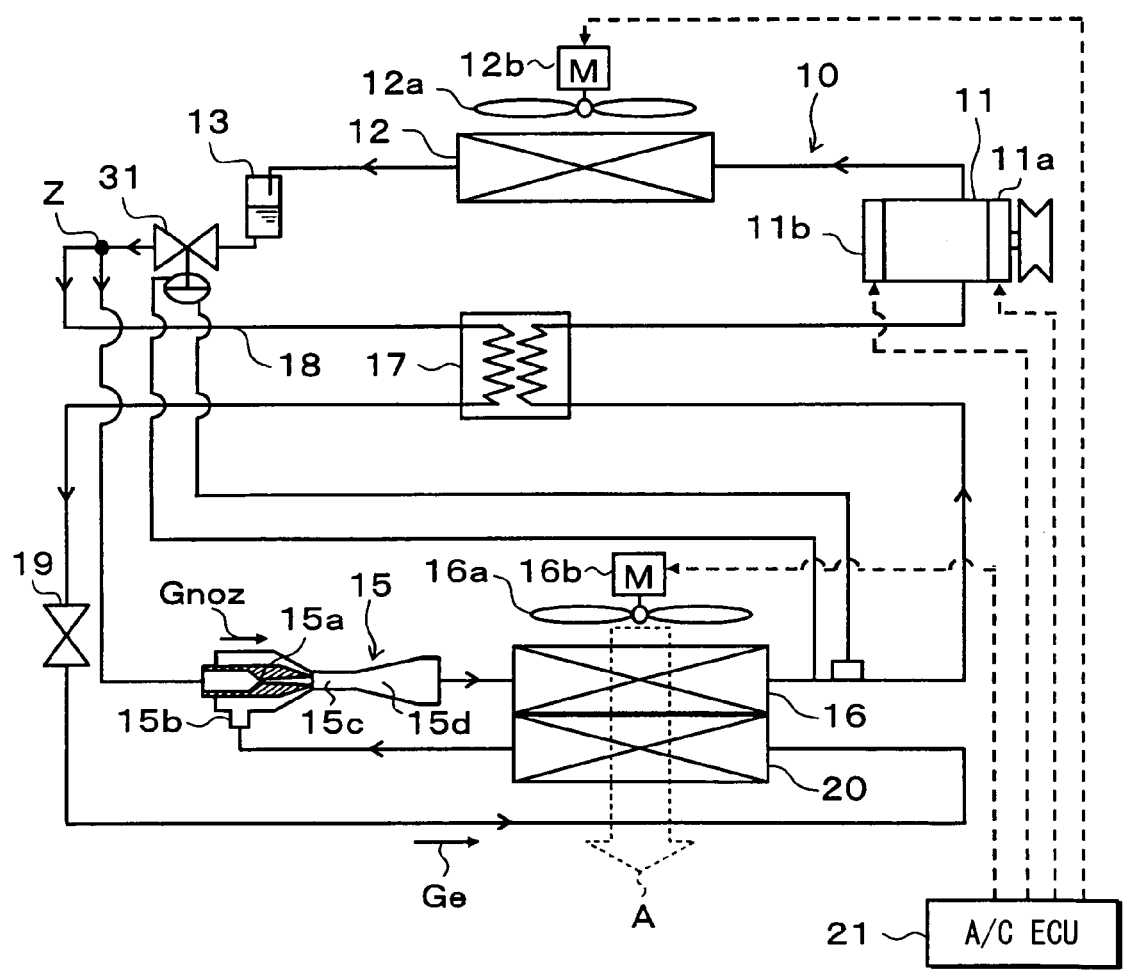
FIG. 2 is a schematic diagram showing an ejector cycle system according to a second embodiment of the present invention.

In the first embodiment, the variable throttling mechanism 14 is located between the branch portion Z and the ejector 15. In the second embodiment, as illustrated in FIG. 2, the variable throttling mechanism 14 shown in FIG. 1 is disused, and a variable throttling mechanism 31 is provided between the liquid receiver 13 and the branch portion Z.

The variable throttling mechanism 31 is a thermal expansion valve that adjusts the refrigerant flow rate so that the degree of superheat of refrigerant on the outlet side of the first evaporator 16 approaches a predetermined value. The construction of the thermal expansion valve is the same as in the first embodiment. That is, the valve body of the variable throttling mechanism 31 is a means for adjusting the refrigerant flow rate of the entire cycle; and the temperature sensitive cylinder and equalizing pipe of the variable throttling mechanism 31 are a means for detecting the physical quantities related to the state of refrigerant in the cycle.

In this second embodiment, the area and the like of the refrigerant passage in the nozzle portion 15a of the ejector 15 and the throttling opening of the fixed throttle 19 are set beforehand to predetermined amounts, so that the flow ratio η becomes equal to the optimum flow ratio ηmax with respect to the flow rate of refrigerant that passes through the variable throttling mechanism 31 when the degree of superheat of refrigerant on the outlet side of the first evaporator 16 becomes equal to a predetermined value. The other aspects of the cycle configuration of the second embodiment are the same as in the first embodiment.

Therefore, when the cycle in this embodiment is operated, the variable throttling mechanism 31 adjusts the flow rate of refrigerant that passes through the variable throttling mechanism 31 so that the degree of superheat of refrigerant on the outlet side of the first evaporator 16 approaches a predetermined value. As a result, the flow ratio η is adjusted so that it approaches the optimum flow ratio ηmax, and the same effect as with the first embodiment can be obtained.

Third Embodiment

Figure 3:
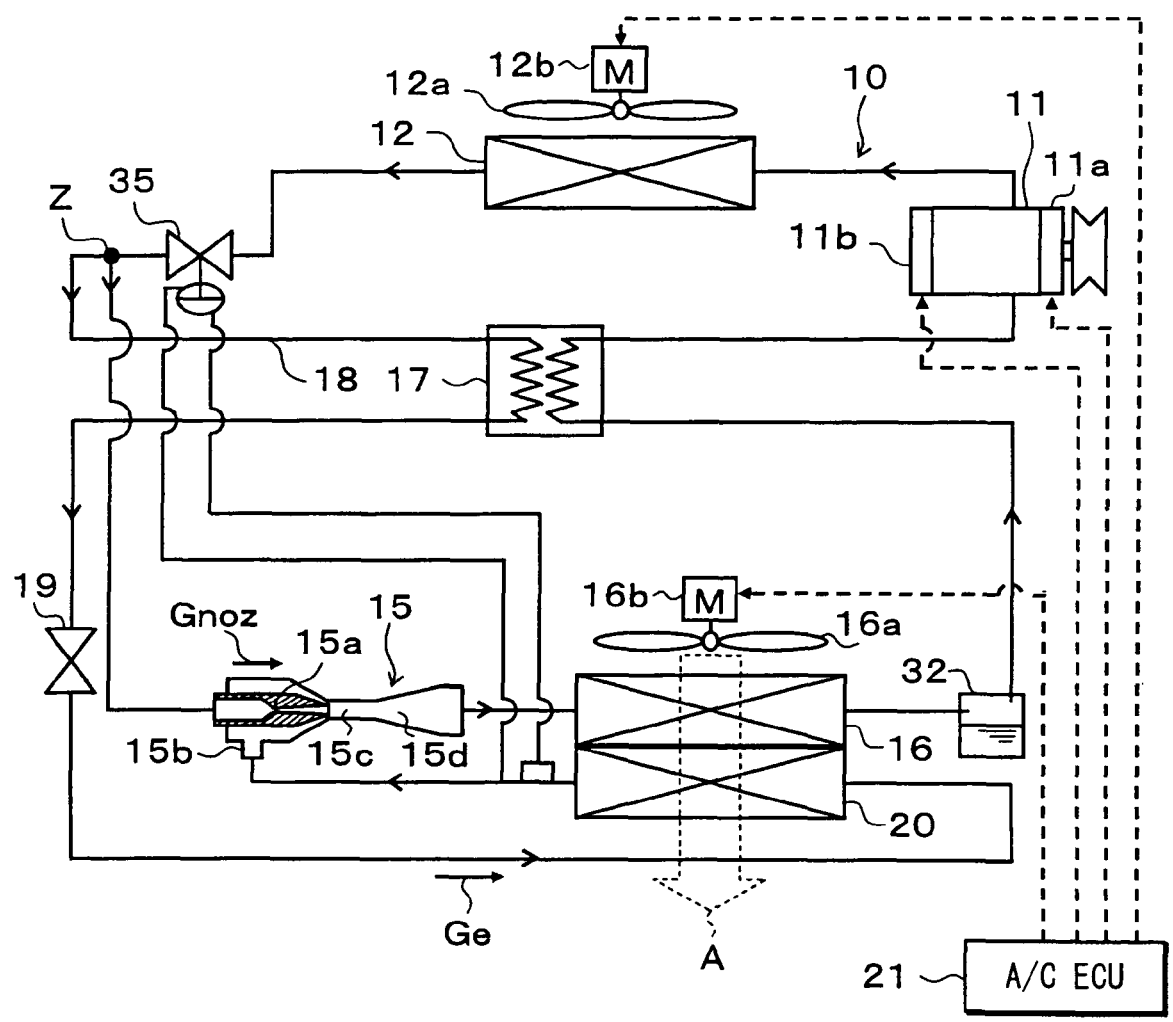
FIG. 3 is a schematic diagram showing an ejector cycle system according to a third embodiment of the present invention.

In a third embodiment, as illustrated in FIG. 3, a variable throttling mechanism 35 is provided between the radiator 12 and the branch portion Z.

The variable throttling mechanism 35 is a thermal expansion valve that adjusts the refrigerant flow rate so that the degree of superheat of refrigerant on the outlet side of the second evaporator 20 approaches a predetermined value. That is, the valve body of the variable throttling mechanism 35 is a means for adjusting the refrigerant flow rate of the entire cycle; and the temperature sensitive cylinder and equalizing pipe of the variable throttling mechanism 35 are a means for detecting the physical quantities related to the state of refrigerant in the cycle.

As shown in FIG. 3, an accumulator 32 for separating liquid phase refrigerant and vapor phase refrigerant from each other is provided downstream of the first evaporator 16. Since the accumulator 32 is provided on the outlet side of the first evaporator 16, liquid phase refrigerant can be prevented from returning to the compressor 11, and the stability of the cycle can be ensured.

In this embodiment, the area and the like of the refrigerant passage in the nozzle portion 15a of the ejector 15 and the throttling opening of the fixed throttle 19 are set beforehand to predetermined amounts so that the following is implemented: the flow ratio η becomes equal to the optimum flow ratio ηmax with respect to the flow rate of refrigerant that passes through the variable throttling mechanism 35 when the degree of superheat of refrigerant on the outlet side of the second evaporator 20 becomes equal to a predetermined value.

Therefore, when the cycle in this embodiment is operated, the variable throttling mechanism 35 adjusts the flow rate of refrigerant passing through the variable throttling mechanism 35 so that the degree of superheat of refrigerant on the outlet side of the second evaporator 20 approaches a predetermined value. As a result, the flow ratio η is so adjusted that it approaches the optimum flow ratio ηmax.

Fourth Embodiment

Figure 4:
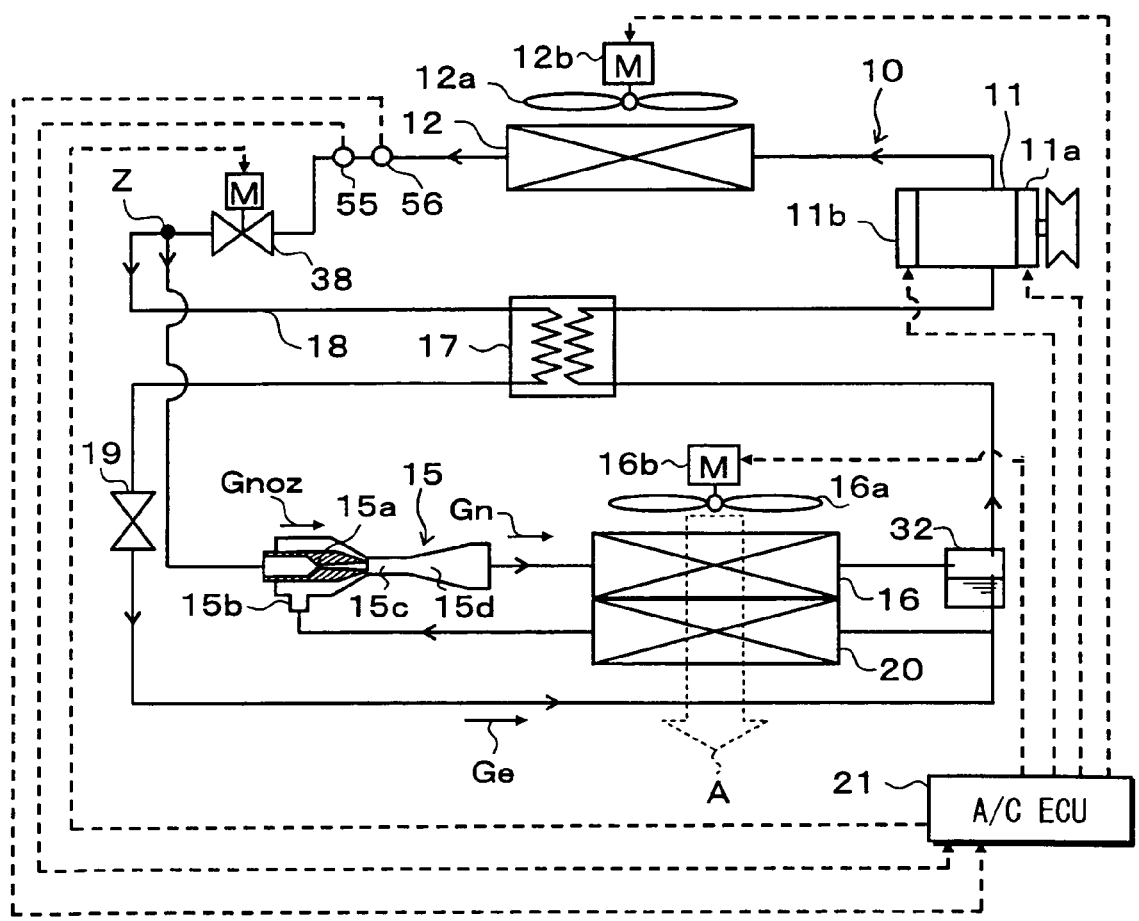
FIG. 4 is a schematic diagram showing an ejector cycle system according to a fourth embodiment of the present invention.

In a fourth embodiment, as illustrated in FIG. 4, an electric variable throttling mechanism 38 is provided downstream of a temperature sensor 55 and a pressure sensor 56 between the radiator 12 and the branch portion Z. The temperature sensor 55 detects a temperature Tc of refrigerant on the outlet side of the radiator 12 and the pressure sensor 56 detects its pressure Pc.

The air conditioning controller 21 adjusts the area of the refrigerant passage in the electric variable throttling mechanism 38 by: computing the degree of subcooling of refrigerant on the outlet side of the radiator 12 based on detection values; and outputting a control signal (pulse signal) so that the degree of subcooling of refrigerant on the outlet side of the radiator 12 approaches a predetermined value.

That is, the electric variable throttling mechanism 38 in this embodiment is a means for adjusting the refrigerant flow rate of the entire cycle; and the temperature sensor 55 and the pressure sensor 56 are a means for detecting the physical quantities related to the state of refrigerant in the cycle.

In this embodiment, the area and the like of the refrigerant passage in the nozzle portion 15a of the ejector 15 and the throttling opening of the fixed throttle 19 are set beforehand to predetermined amounts, so that the flow ratio η becomes equal to the optimum flow ratio ηmax with respect to the flow rate of refrigerant that passes through the electric variable throttling mechanism 38 when the degree of subcooling of refrigerant on the outlet side of the radiator 12 becomes equal to a predetermined value.

Therefore, when the cycle in this embodiment is operated, the electric variable throttling mechanism 38 operates to control the flow rate of refrigerant passing through the electric variable throttling mechanism 38 so that the degree of subcooling of refrigerant on the outlet side of the radiator 12 approaches a predetermined value. As a result, the flow ratio η is so adjusted that it approaches the optimum flow ratio ηmax.

Fifth Embodiment

Figure 5:
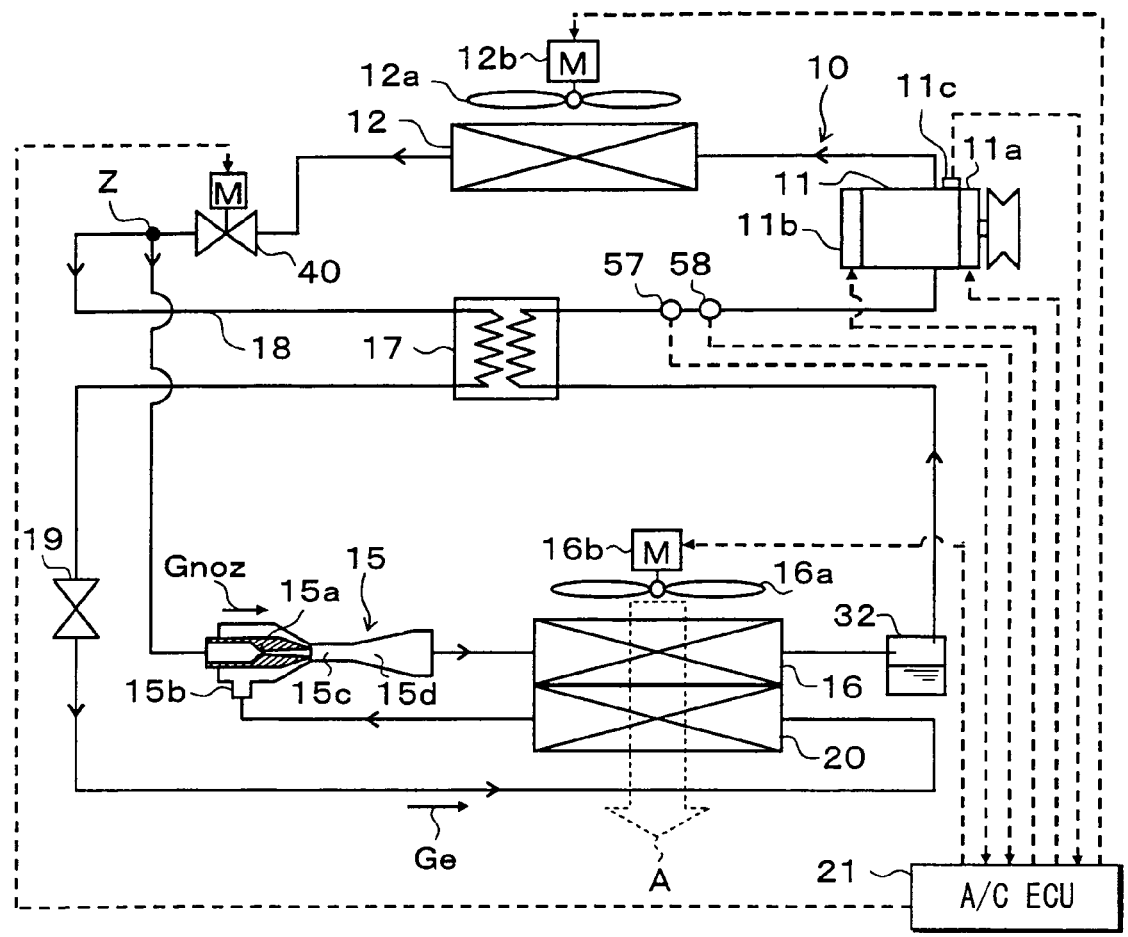
FIG. 5 is a schematic diagram showing an ejector cycle system according to a fifth embodiment of the present invention.
Figure 6:
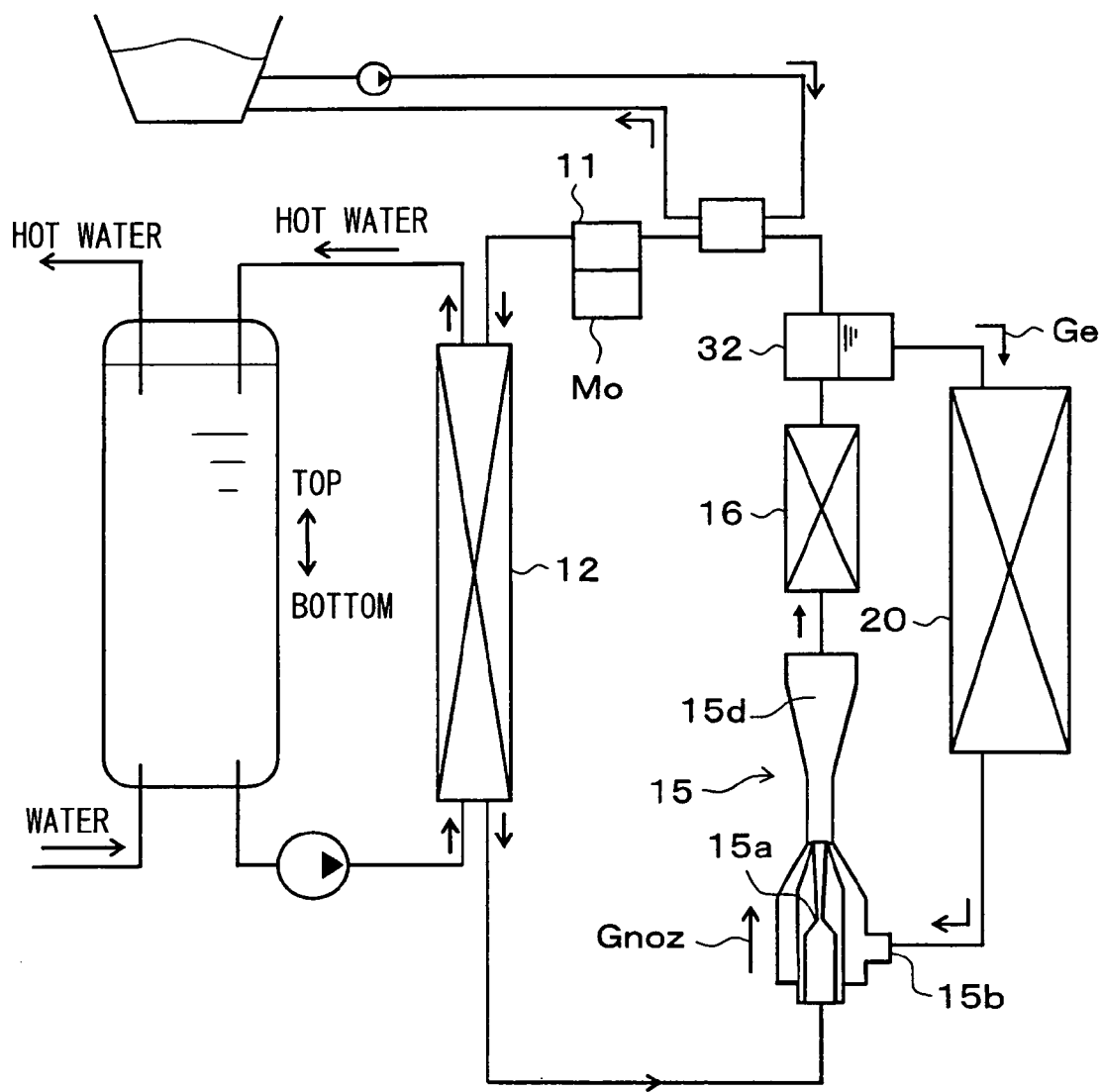
FIG. 6 is a schematic diagram showing an ejector cycle system according to a conventional example.
Figure 7:
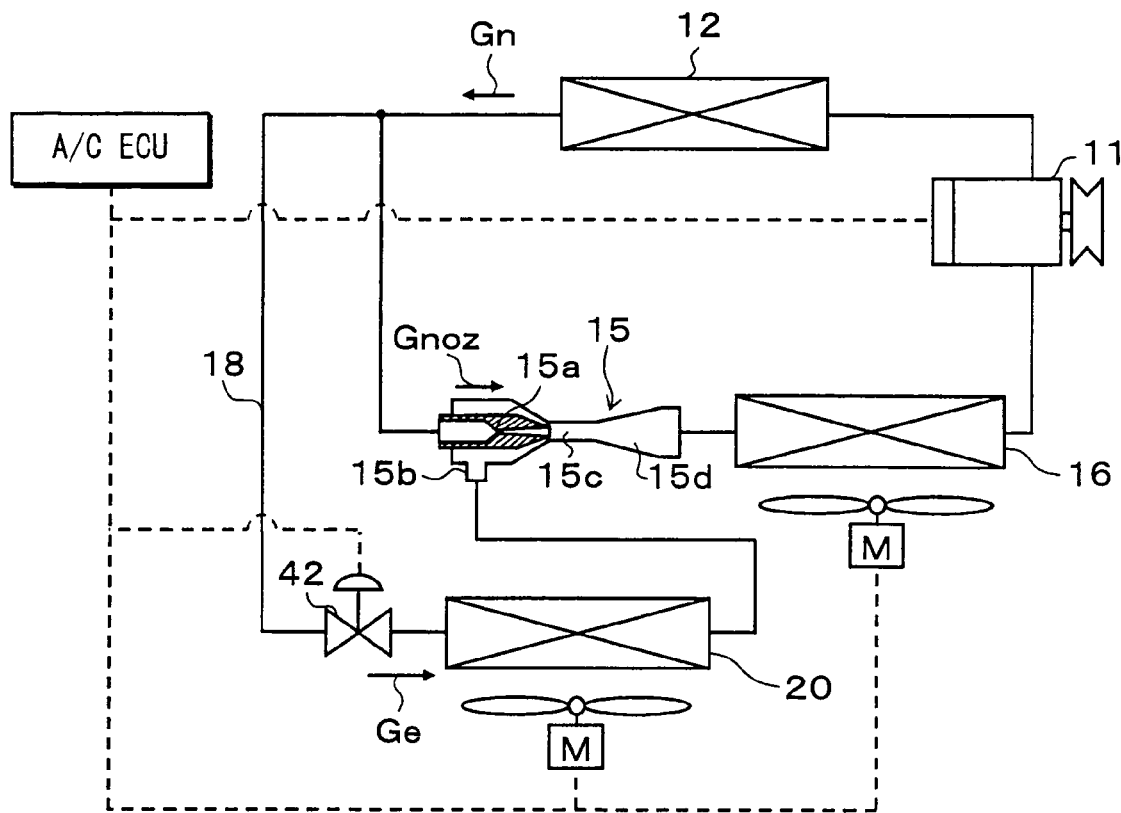
FIG. 7 is a schematic diagram showing an ejector cycle system according to a comparison example of the present invention.

In a fifth embodiment, as illustrated in FIG. 5, an electric variable throttling mechanism 40 is provided between the radiator 12 and the branch portion Z.

As in the fifth embodiment, the air conditioning controller 21 computes the refrigerant discharge flow rate of the compressor 11 from Tsi, Psi, the number of revolutions Nc, and the control current In. In the air conditioning controller 21, there is beforehand stored the area of the refrigerant passage corresponding to the output (number of pulse counts) of a control signal (pulse signal) outputted to the electric variable throttling mechanism 40.

In this embodiment, the area and the like of the refrigerant passage in the nozzle portion 15a of the ejector 15 and the throttling opening of the fixed throttle 19 are set beforehand to predetermined amounts so that the following is implemented: the flow ratio η becomes equal to the optimum flow ratio ηmax when the flow rate of refrigerant passing through the electric variable throttling mechanism 40 becomes equal to a predetermined value.

That is, in this embodiment, the electric variable throttling mechanism 40 is a means for adjusting the refrigerant flow rate of the entire cycle; and the temperature sensor 57, pressure sensor 58, tachometer 11c are a means for detecting the physical quantities related to the state of refrigerant in the cycle.

Therefore, when the cycle in this embodiment is operated, the air conditioning controller 21 computes the refrigerant discharge flow rate of the compressor 11. Therefore, the area of the refrigerant passage in the electric variable throttling mechanism 40 is adjusted so that the flow rate of refrigerant passing through the electric variable throttling mechanism 40 becomes equal to a predetermined value, based on the following: the computed refrigerant discharge flow rate; and the area of the refrigerant passage corresponding to the output (number of pulse counts) of a control signal (pulse signal) to the electric variable throttling mechanism 40, stored beforehand. As a result, in the fifth embodiment, by adjusting the throttling mechanism 40, the flow amount of refrigerant in the whole cycle is approached to a predetermined amount, and thereby the flow ratio η approaches the optimum flow ratio ηmax.

Other Embodiments

The invention is not limited to the above-mentioned embodiments, and various modifications can be made as described later.

The above embodiments are examples in which the invention is applied to refrigerator device for vehicles and the space to be cooled with the first evaporator 16 and that with the second evaporator 20 are identical. The space to be cooled with the first evaporator 16 and that with the second evaporator 20 may be separated from each other.

For example, the following construction may be adopted: the space to be cooled with the first evaporator 16 is the front seat area in a vehicle compartment and the space to be cooled with the second evaporator 20 is the rear seat area in the vehicle compartment. In cases where the spaces to be cooled are different from each other, the following construction may be adopted: a dedicated blower for evaporator is provided for each evaporator, and the quantities of air sent by the blowers for evaporator are individually controlled. Thus, the flow ratio η may be adjusted by adjusting the flow rate Gnoz of refrigerant that virtually passes through the nozzle portion 15a of the ejector 15 and the flow rate Ge of refrigerant drawn into the refrigerant suction port 15b of the ejector 15.

In the above embodiments, a variable displacement compressor is used for the compressor 11. Then, its electric capacity control valve 11b is controlled by the air conditioning controller 21, and the refrigerant discharge capability of the compressor 11 is thereby controlled. Instead, the following construction may be adopted: such a fixed displacement compressor is used, and the ratio of the operating state to the non-operation state (operating ratio) of the fixed displacement compressor is controlled by the electromagnetic clutch. The refrigerant discharge capability of the compressor is thereby controlled.

An electric compressor may be used for the compressor. In this case, the refrigerant discharge capability can be controlled by controlling the number of revolutions of the electric compressor 11.

The above embodiments, a variable ejector whose nozzle opening is variable may be used to adjust the refrigerant flow rate Gnoz. Specifically, the variable ejector is an ejector provided with a passage area varying mechanism that is capable of variably controlling the area of the refrigerant passage in its nozzle portion according to external signals. Use of a variable ejector also makes it possible to save the space for the ejector cycle system.

In the first and second embodiments, the degree of superheat of refrigerant on the outlet side of the first evaporator 16 is detected with the temperature sensitive cylinder and equalizing pipe of the thermal expansion valve. In the fourth and fifth embodiments, it is detected with the temperature sensor 51 and the pressure sensor 52. The detecting means for the degree of superheat of refrigerant on the outlet side of the first evaporator 16 is not limited to them.

Some examples will be taken. It can be estimated from the refrigerant evaporating temperature or pressure of the first evaporator 16 and the temperature of refrigerant on the outlet side of the first evaporator 16.

It can also be estimated from the refrigerant evaporating temperature or pressure of the first evaporator 16 and the blown air temperature of the first evaporator 16. This is because, when the degree of superheat is increased, the cooling capacity of the first evaporator 16 is lowered and the blown air temperature of the first evaporator 16 is raised.

In addition, the degree of superheat can also be estimated from the inlet air temperature of the first evaporator 16 and the temperature of refrigerant on the outlet side of the first evaporator 16. The degree of superheat can also be estimated from the inlet air temperature of the first evaporator 16 and the blown air temperature of the first evaporator 16.

The degree of superheat can also be estimated from only the inlet air temperature of the first evaporator 16. The reason for this is as follows: in cases where the air in a space to be cooled (freezing chamber) is circulated and cooled in an evaporator as in a refrigerator, the air temperature from the first evaporator 16 rises when the degree of superheat becomes too high. As a result, the temperature in the freezing chamber rises, and thus the inlet air temperature of the first evaporator 16 also rises.

Therefore, the degree of superheat of refrigerant on the outlet side of the first evaporator 16 can also be detected using a means for detecting the above-mentioned physical quantities.

In the third embodiment, the degree of superheat of refrigerant on the outlet side of the second evaporator 20 is detected with the temperature sensitive cylinder and equalizing pipe of the thermal expansion valve. The detecting means for the degree of superheat of refrigerant on the outlet side of the second evaporator 20 is not limited to them.

Some examples will be taken. In the above description, the degree of superheat of refrigerant on the outlet side of the first evaporator 16 is detected. Similarly, it can be estimated from the refrigerant evaporating temperature or pressure of the second evaporator 20 and the temperature of refrigerant on the outlet side of the second evaporator 20. In addition, it may be estimated from the refrigerant evaporating temperature or pressure of the second evaporator 20 and the blown air temperature of the second evaporator 20.

The degree of superheat can also be estimated by other methods. Such methods include estimation by: a combination of the inlet air temperature of the second evaporator 20 and the temperature of refrigerant on the outlet side of the second evaporator 20; a combination of the inlet air temperature of the second evaporator 20 and the blown air temperature of the second evaporator 20; and only the inlet air temperature of the second evaporator 20.

Therefore, the degree of superheat of refrigerant on the outlet side of the second evaporator 20 can also be detected using a means for detecting the above-mentioned physical quantities.

In the fourth embodiment, the degree of subcooling of refrigerant on the outlet side of the radiator 12 is detected with the temperature sensors 55 and 56. The detecting means for the degree of subcooling of refrigerant on the outlet side of the radiator 12 is not limited to them.

For example, it can be estimated from: a combination of the refrigerant condensation temperature (refrigerant pressure) of the radiator 12 and the temperature of refrigerant on the outlet side of the radiator 12; a combination of the inlet air temperature of the radiator 12 and the outlet refrigerant temperature of the radiator 12; or the dryness of refrigerant on the outlet side of the radiator 12.

Therefore, the degree of subcooling of refrigerant on the outlet side of the radiator 12 can also be detected using a means for detecting above-mentioned physical quantities.

In the above embodiments, the variable throttling mechanism 14, 31, 35 and the electric variable throttling mechanism 38, 40 are disposed as follows to adjust the flow ratio η: they are placed between the branch portion Z and the ejector 15 and between the branch portion Z and the second evaporator 20. A flow rate-variable three-way valve may be used at the branch portion Z.

Specifically, a rotary valve-type variable flow rate three-way valve driven by a stepping motor can be used. Thus, the opening area on the ejector 15 side at the branch portion Z and the opening area on the branch passage 18 side (second evaporator 20 side) can be simultaneously and continuously varied. This makes the adjustment of flow ratio η easier.

In the above embodiments, a thermal expansion valve is used for the variable throttling mechanism 14, 31, 35, and a flow control valve driven by a stepping motor is used for the electric variable throttling mechanism 38, 40. Instead, a variable throttling mechanism in which multiple fixed throttles different in characteristics are changed and used may be used.

Or, the above-mentioned variable throttling mechanism, electric variable throttling mechanism, and fixed throttle in the above embodiments may be combined and used.

The above embodiments use two evaporators, the first evaporator 16 and the second evaporator 20. The number of evaporators may be further increased, and three or more evaporators may be used.

For example, the following construction may be adopted with respect to the first embodiment: a second branch passage is provided which connects the section between the internal heat exchanger 17 and the fixed throttle 19 in the branch passage 18 and the outlet of the first evaporator 16; and a fixed throttle and a third evaporator are provided in the second branch passage.

In this case, the throttling opening of the fixed throttle 19 and that of the fixed throttle placed in the second branch passage only have to be so set that the following is implemented: the flow rate of refrigerant that passes through the variable throttling mechanism 14 when the degree of superheat of refrigerant on the outlet side of the first evaporator 16 becomes equal to a predetermined value, the flow rate of refrigerant passing through the fixed throttle 19, and the flow rate of refrigerant passing through the fixed throttle placed in the second branch passage enhance the cooling capacity Qer of the entire system.

The cycles in the above embodiments are examples of subcritical cycles in which a high pressure does not exceed the critical pressure of refrigerant. As described in connection with the 11th embodiment, the invention may be applied to a supercritical cycle in which a high pressure exceeds the critical pressure of refrigerant.

In the invention, the flow ratio (η), the refrigerant flow rate of the entire cycle, the refrigerant discharge flow rate, and the air quantity are adjusted based on the detection values of detecting means. Instead, a number of these adjusting means may be combined. For example, the following construction may be adopted: a first variable throttling mechanism is provided between the branch portion Z and the ejector 15; a second variable throttling mechanism is provided in the branch passage 18 upstream of the second evaporator 20; and the flow ratio η is directly controlled by controlling Gnoz and Ge.

In the above embodiments, an ejector cycle system of the invention is applied to refrigerator device for vehicles. Instead, it may be applied to a stationary refrigerator, stationary freezing chamber, refrigeration system, or vapor compression cycle, such as heat pump cycle for water heater.

In the above-described any embodiments, $CO_2$ refrigerant or HC refrigerant may be used as the refrigerant. Chlorofluorocarbon is a generic name of organic compounds comprising carbon, fluorine, chlorine, and hydrogen, and is widely used as refrigerant.

Fluorocarbon refrigerant includes HCFC (hydrochlorofluorocarbon) refrigerant, HFC (hydrofluorocarbon) refrigerant, and the like. These refrigerants are designated as alternatives for chlorofluorocarbon because they do not destroy the ozone layer.

HC (hydrocarbon) refrigerant is refrigerant substances that contain hydrogen and carbon and occur in nature. The HC refrigerant includes R600a (isobutane), R290 (propane), and the like.

While the invention has been described with reference to preferred embodiments thereof, it is to be understood that the invention is not limited to the preferred embodiments and constructions. The invention is intended to cover various modification and equivalent arrangements. In addition, while the various elements of the preferred embodiments are shown in various combinations and configurations, which are preferred, other combinations and configuration, including more, less or only a single element, are also within the spirit and scope of the invention.

What is claimed is:

1. An ejector cycle system with a refrigerant cycle through which refrigerant flows, comprising:
    a compressor configured to draw and compress refrigerant;
    a radiator located to radiate heat from high-pressure refrigerant discharged from the compressor;
    an ejector disposed downstream of the radiator, the ejector having a nozzle portion for depressurizing and expanding refrigerant, a refrigerant suction port through which refrigerant is drawn by a high-speed refrigerant flow jetted from the nozzle portion, and a pressure increasing portion for mixing refrigerant drawn through the refrigerant suction port with the high-speed refrigerant flow and for decelerating the mixed refrigerant flow to raise a pressure of the refrigerant flow;
    a first evaporator located to evaporate the refrigerant flowing out of the ejector;
    a branch passage that is branched from a branch portion between the radiator and the nozzle portion of the ejector and is coupled to the refrigerant suction port, for guiding the refrigerant flowing out of the radiator into the refrigerant suction port;
    a throttling unit that is located in the branch passage and depressurizes refrigerant to adjust a flow amount of refrigerant;
    a second evaporator that is located downstream of the throttling unit to evaporate refrigerant; and
    a variable throttling device located in a refrigerant passage between a refrigerant outlet side of the radiator and the branch portion, the variable throttling device decompressing the refrigerant flowing out of the radiator, wherein
    the variable throttling device is configured to adjust an opening degree of a valve body portion, based on at least one of a superheat degree of refrigerant at a refrigerant outlet side of the first evaporator, a superheat degree of refrigerant at a refrigerant outlet side of the second evaporator, a supercool degree of refrigerant at the refrigerant outlet side of the radiator, a temperature and a pressure of refrigerant at the refrigerant outlet side of the radiator, a flow amount of refrigerant discharged from the compressor, a temperature of a space to be cooled by the first evaporator and the second evaporator, and an ambient temperature of the space to be cooled, and the variable throttling device adjusts a flow ratio between the refrigerant that passes through the nozzle portion of the ejector and the refrigerant drawn through the refrigerant suction port.

2. The ejector cycle system according to claim 1, wherein the variable throttling device is configured to adjust the opening degree of the valve body portion, based on at least the superheat degree of refrigerant at the refrigerant outlet side of the first evaporator, and the variable throttling device is configured to adjust the flow amount of refrigerant in the whole refrigerant cycle such that the superheat degree of the refrigerant at the refrigerant outlet side of the first evaporator approaches a predetermined value.

3. The ejector cycle system according to claim 1, wherein the variable throttling device is configured to adjust the opening degree of the valve body portion, based on at least the superheat degree of refrigerant at the refrigerant outlet side of the second evaporator, and the variable throttling device is configured to adjust the flow amount of refrigerant in the whole refrigerant cycle such that the superheat degree of the refrigerant at the refrigerant outlet side of the second evaporator approaches a predetermined value.

4. The ejector cycle system according to claim 1, wherein the variable throttling device is configured to adjust the opening degree of the valve body portion, based on at least the supercool degree of refrigerant at the refrigerant outlet side of the radiator, and the variable throttling device is configured to adjust the flow amount of refrigerant in the whole refrigerant cycle such that the supercool degree of the refrigerant at the refrigerant outlet side of the radiator is approached to approaches a predetermined value.

5. The ejector cycle system according to claim 1, wherein the high-pressure refrigerant discharged from the compressor has a pressure higher than a critical pressure of the refrigerant, the variable throttling device is configured to adjust the opening degree of the valve body portion, based on at least the temperature and the pressure of refrigerant at the refrigerant outlet side of the radiator, and the variable throttling device is configured to adjust the flow amount of refrigerant in the whole refrigerant cycle such that the pressure or the temperature of the refrigerant at the refrigerant outlet side of the radiator approaches a predetermined value.

6. The ejector cycle system according to claim 1, wherein the variable throttling device is configured to adjust the opening degree of the valve body portion, based on at least the flow amount of refrigerant discharged from the compressor, and the variable throttling device is configured to adjust the flow amount of refrigerant in the whole refrigerant cycle such that the flow amount of refrigerant in the whole refrigerant cycle approaches a predetermined value.

7. The ejector cycle system according to claim 1, wherein the branch passage is provided such that all the refrigerant flowing into the refrigerant suction port of the ejector is the refrigerant flowing from the branch portion through the branch passage.

8. The ejector cycle system according to claim 1, further comprising:

a gas-liquid separator located between the radiator and the variable throttling device to separate refrigerant on a downstream side of the radiator into gas refrigerant and liquid refrigerant, wherein the gas-liquid separator is connected to the variable throttling device such that liquid refrigerant separated at the gas-liquid separator flows into the variable throttling device.

9. The ejector cycle system according to claim 1, wherein the branch portion always branches the refrigerant flowing out of the radiator into a first flow going to the nozzle portion and a second flow going to the refrigerant suction port.

10. The ejector cycle system according to claim 1, wherein the variable throttling device is a thermal expansion valve.

11. The ejector cycle system according to claim 1, wherein the variable throttling device depressurizes high-pressure liquid phase refrigerant into intermediate-pressure refrigerant with vapor and liquid two phases.

12. The ejector cycle system according to claim 1, wherein the ejector cycle system further comprises a liquid receiver separating refrigerant into vapor and liquid, the liquid receiver is located between the radiator and the variable throttling device with respect to a refrigerant flow, and the variable throttling device depressurizes high-pressure liquid phase refrigerant from the liquid receiver into intermediate-pressure refrigerant with vapor and liquid two phases.

* * * * *